May 25, 1937.  F. WINKLER  2,081,567

COASTER BRAKE AND BRAKE APPLYING DEVICE

Filed March 18, 1936

Inventor
FRANZ WINKLER
By Attorneys

Patented May 25, 1937

2,081,567

UNITED STATES PATENT OFFICE 2,081,567

COASTER-BRAKE AND BRAKE-APPLYING DEVICE

Franz Winkler, Wurzburg, Germany

Application March 18, 1936, Serial No. 69,437
In Germany March 18, 1935

6 Claims. (Cl. 192—6)

The invention relates to a coaster-brake for free-wheel hubs in bicycles, and more particularly to brake-applying means operating on a sleeve-like brake member adapted to be expanded and forced to the inner cylindric face of the body to be checked in rotation, especially the wheel hub enclosing the brake.

The object of the invention is to provide, besides conical wedges driven into the ends of the brake sleeve, expanding rollers acting against the inner face of said sleeve, the arrangement of the operative means relatively to their common bearing element being such that the different expanding means are operative independently of each other when the bearing element is forcibly rotated and axially displaced towards the brake sleeve.

This object is attained by disposing both the shiftable wedge-cone and the expanding rollers on the bearing element movably in the circumferential direction, so that said element may adjust itself for correspondingly equilibrizing the action of the different expanding appliances on the brake sleeve which thus is subject to radial expansion in its entire length.

Other objects and special means will be disclosed in the following detailed description and claims.

In the accompanying drawing, which forms a part of this specification, an embodiment of the invention is shown by way of example. In the drawing—

Like numerals denote like parts throughout all figures of the drawing.

Figure 1:
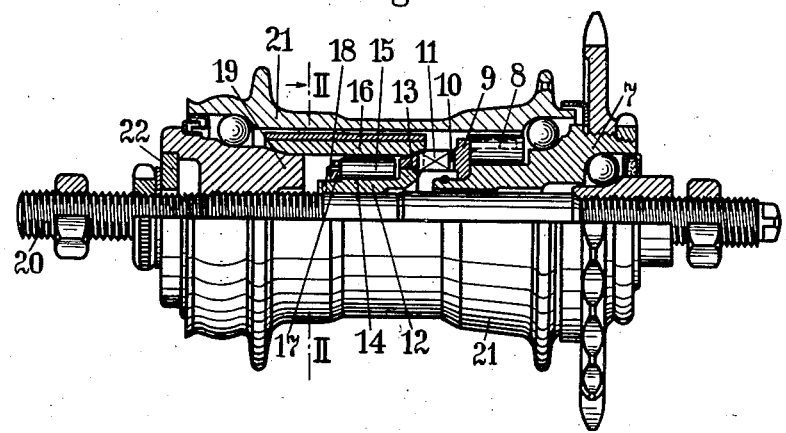
Fig. 1 is a longitudinal sectional view and partly a side view of a free-wheel hub with coaster brake comprising the combined brake-expanding means according to the invention.

In the embodiment shown in the drawing the free-wheel coaster hub comprises a hub shell 21, a driving member 7, mounted on a stationary wheel axle 20, a driving clutch permitting free-wheeling, a brake mounted interiorly of the hub shell on the wheel axle, means located between the driver and the brake and adapted to apply the latter, and a brake arm 22 interconnecting the brake with the bicycle frame so as to prevent rotation of the brake and the axle.

The driving and free-wheeling clutch disposed between the hub shell 21 and the driver 7 is composed of a plurality of cylindrical clutch rollers 8 placed in eccentrical recesses provided in the circumference of a sleeve like extension of the driver 7, a guide ring 9 slipped on the driver receiving the rollers in perforations so that they are spaced apart and allowed to get contact with the hub shell. From the left hand side of the plane portion of the guide ring a number of axial teeth 10 having axial front faces and helically shaped rear faces project between similar but oppositely arranged teeth 11 of a coupling sleeve 12 rotatably and shiftably supported on the axle 20. By this engagement on forward rotation of the driver 7 the sleeve 12 will be carried round with the same, but on backward pedalling and consequent backward rotation of the driver the oblique or helical rear faces of the teeth 10 and 11 will co-operate so as to displace the sleeve 12 to the left in Fig. 1.

Figure 2:
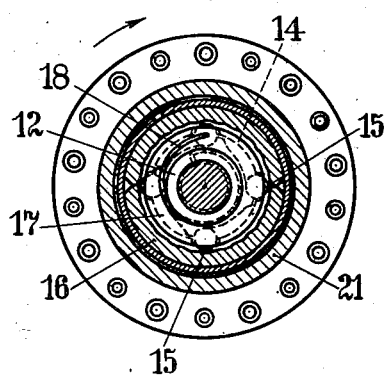
Fig. 2 is a cross section on the line II—II of Fig. 1 showing a slight modification.

At the opposite side of the teeth 11 a brake expanding ring 13 having its circumference conical-shaped is freely revolubly placed on a circular seat of the sleeve 12 with an axial support on the rear side of said teeth, while on the cylindrical portion of the sleeve 12 friction rollers 15 in a similar arrangement as the clutch rollers 8 are disposed in recesses with eccentrical or cam faces 14 of such a shape that the rollers 15 are forced radially outwards when the sleeve 12 is rotated backwards, as indicated by the arrow in Fig. 2. The rollers are spaced apart and retained in perforations of a guide ring 17 which is rotatable on the sleeve 12 within given limits.

Surrounding said parts is an expansible brake sleeve 16 mounted in the shell 21 and supported on, and non-rotatably connected at its left end with, a conical member 19 screwed on the axle 20, while the right hand end of said brake sleeve is concentrically carried by the conical ring 13. The conical brake-expanding bearing member 19 on its part is non-revolubly fastened to the vehicle frame through an interconnecting arm 22.

Figure 3:
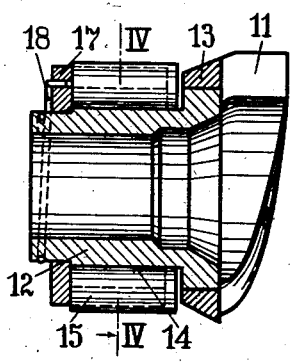
Figs. 3, 4 and 5 represent on a larger scale respectively a longitudinal section, a cross section on the line IV—IV of Fig. 3, and an end view of the bearing element with the brake-expanding means.
Figure 4:
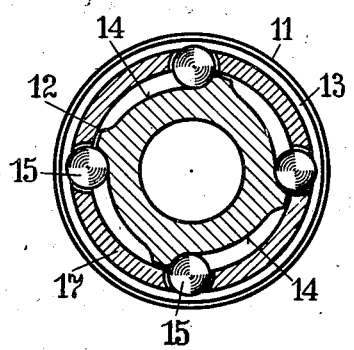
Figure 5:
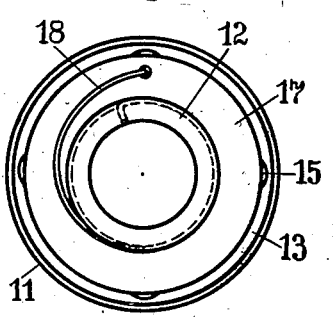

As more clearly shown in Figs. 3 and 5, on the left hand end of the sleeve 12 a light spiral spring 18 is fastened by its engagement into a radial bore of the sleeve, while its other end engages in an axial bore of the guide ring 17 thereby continuously tending to rotate the guide ring 17 and consequently the rollers 15 in the direction of forward rotation of the shell 21 so that the rollers are permanently held in slight contact with the bore of the brake sleeve 16 thereby acting as a frictional retarding device.

In Fig. 1 the bore of the brake sleeve 16 is shown as being an exact cylindrical face allowing the rollers smoothly to roll thereon round on forward rotation and to get their coupling grip instantaneously on backward rotation for braking, thus preventing undue slip of the sleeve 12.

In Fig. 2 shallow depressions are represented in the bore of the brake sleeve which may be provided when a viscous lubricant is to be used in the hub.

Ball bearings are provided at all points of relative angular movement of the constituting parts.

The operation of the free-wheel hub with coaster brake and the brake applying means is as follows.

During the drive of the vehicle the driving body 7 is coupled to the hub shell 21 by the friction rollers 8, the coupling sleeve 12 being carried round owing to the constant engagement of the teeth 10 and 11 while the ring 13 is immovably held in the brake sleeve 16 and the rollers 15 roll along the inner periphery of the sleeve 16. On free-wheeling the clutch rollers 8 recede from the hub shell 21, whereafter all parts housed in the shell are held non-revolubly. Backward rotation of the driver 7 for the purpose of applying the brake will cause axial displacement and at the same time a limited backward rotation of the sleeve 12 by means of the helical faces of the teeth 10 and 11. This displacement of the sleeve 12 in two directions effects the expansion of the brake sleeve 16 through the mediation of the conical brake-expanding ring 13 co-operative with the opposite cone 19 and the rollers 15 rising on the cam faces 14. Should the brake sleeve be expanded first by the rollers 15 the sleeve 12 will be free to further moving axially under the action of the teeth 10 and 11, so that the ring 13 will again be forced against the sleeve 16 and vice versa. Thus a reciprocal instantaneous balancing of the effort of the two brake-expanding means is obtained, the brake sleeve being expanded at both ends and its middle portion.

I claim:

1. In a free-wheel coaster brake of the kind described, the combination with a sleeve-like expansible brake, of a pair of conical brake-expanding members, the one being stationary and the other axially shiftable, an axially and rotatably displaceable bearing member provided with cam faces, and brake expanding rollers mounted on said bearing member and movable along said cam faces, the said shiftable cone being mounted on said bearing member and relatively rotatable with respect to said bearing member.

2. In a free-wheel coaster brake of the kind described, the combination with an expansible brake sleeve, of a stationary brake-expanding cone, an axially displaceable brake-expanding cone, an axially and angularly movable bearing member, brake-expanding rollers located between the said two cones on the bearing member inside the brake sleeve, cam faces formed on the bearing member and acting upon the said rollers, a guide ring receiving the rollers in perforations, and a spring interengaged with the bearing member and the guide ring and tending to rotate the latter on the former in the forward direction, said movable brake-expanding cone being mounted on said bearing member for relative rotation with respect to said bearing member.

3. In a free-wheel coaster brake hub of the kind described, the combination with a wheel axle, of a driver rotatably mounted thereon, a stationary cone member fixed to the axle, a hub shell rotatably mounted on said driver and stationary cone, an expansible brake sleeve non-revolubly attached to the stationary cone with one of its ends, a shiftable and rotatable bearing member located between the driver and the stationary cone within the brake sleeve, a free-wheel clutch between the driver and the hub-shell, helical controlling means interengaging the driver with said bearing member, a shiftable brake-expanding cone mounted upon the bearing member and relatively rotatable with respect to said bearing member while engaging with its conical periphery the other end of the brake sleeve, brake expanding rollers angularly movable on cam faces of the bearing member, and a roller spacing guide ring adapted to hold the rollers urged against the bore of the brake sleeve.

4. In a free-wheel coaster brake of the kind described, the combination with an expansible brake sleeve, of a stationary and a shiftable brake-expanding cone, each engaging into one of the ends of the brake sleeve, a driver, a bearing member independent of the driver, helical controlling means interposed between the driver and the bearing member, the bearing member supporting the shiftable cone against radial and axial movement with respect to said bearing member while permitting relative rotation therebetween, cam faces on the periphery of the bearing member, brake-expanding rollers circumferentially movable upon said cam faces, a guide ring receiving the rollers and spring means adapted to place the rollers against the inner face of the brake sleeve.

5. In a free-wheel hub with coaster brake of the kind described, the combination with an expansible brake sleeve having a smooth bore, of a bearing member placed within the brake sleeve, a stationary and a movable brake-expanding cone, the latter being mounted on the bearing member and relatively rotatable with respect to said latter member, cam faces provided on the periphery of the bearing member, brake-expanding rollers circumferentially movable on said cam faces, a roller guide ring, and spring means adapted to place the rollers against the bore of the brake sleeve.

6. In a free-wheel hub with coaster brake of the kind described, the combination with an expansible brake sleeve having a corrugate bore, of a bearing member placed within the brake sleeve, a stationary and a movable brake-expanding cone, the latter being mounted on the bearing member and relatively rotatable with respect to said latter member, cam faces provided on the periphery of the bearing member, brake-expanding rollers circumferentially movable on said cam faces, a roller guide ring, and spring means adapted to place the rollers against the bore of the brake sleeve.

FRANZ WINKLER.